(12) United States Patent  
Aleem et al.

(10) Patent No.: US 12,094,171 B2
(45) Date of Patent: Sep. 17, 2024

(54) CALIBRATING CAMERA IN ELECTRONIC DEVICE

(71) Applicant: GOOGLE LLC, Mountain View, CA (US)

(72) Inventors: Idris Syed Aleem, Kitchener (CA); Zhiheng Jia, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 28 days.

(21) Appl. No.: 18/056,054

(22) Filed: Nov. 16, 2022

(65) Prior Publication Data

US 2024/0161340 A1    May 16, 2024

(51) Int. Cl.
*G06T 7/80* (2017.01)
*G06V 40/16* (2022.01)
*H04N 23/66* (2023.01)
*H04N 23/85* (2023.01)

(52) U.S. Cl.
CPC .............. *G06T 7/80* (2017.01); *G06V 40/168* (2022.01); *H04N 23/66* (2023.01); *H04N 23/85* (2023.01)

(58) Field of Classification Search
CPC ........ G06T 7/80; G06V 40/168; H04N 23/85; H04N 23/66
USPC ...................................................... 348/211.9
See application file for complete search history.

(56) References Cited

U.S. PATENT DOCUMENTS

| | | | | |
|---|---|---|---|---|
| 6,798,446 B2 * | 9/2004 | Maggi | ................. | H04N 17/002 |
| | | | | 348/207.99 |
| 7,479,982 B2 * | 1/2009 | Otani | ..................... | G01C 11/06 |
| | | | | 348/51 |
| 7,554,575 B2 * | 6/2009 | Zandifar | .............. | G09G 3/2092 |
| | | | | 348/207.99 |
| 7,733,404 B2 * | 6/2010 | Zandifar | .............. | G09G 3/2092 |
| | | | | 348/333.01 |
| 8,743,214 B2 * | 6/2014 | Grossmann | ............... | G06T 7/80 |
| | | | | 348/188 |
| 9,282,326 B2 * | 3/2016 | Olson | .................. | H04N 17/002 |
| 9,305,482 B2 * | 4/2016 | Park | ........................ | G01J 3/506 |
| 10,192,325 B2 * | 1/2019 | Shen | ......................... | G06T 7/00 |
| 10,475,209 B2 * | 11/2019 | Shen | ......................... | G06T 7/80 |

(Continued)

OTHER PUBLICATIONS

"Using the Single Camera Calibrator App", The MathWorks, Inc., 2022, 10 pages.

(Continued)

*Primary Examiner* — Pritham D Prabhakher
(74) *Attorney, Agent, or Firm* — Brake Hughes Bellermann LLP

(57) ABSTRACT

A method performed by a server can include sending a first webpage to a first computing device, the first computing device including a camera, the first webpage including an image-capturing function and including an instruction for a user to obtain a second webpage via a second computing device, the second webpage including a calibration image file; receiving, from the first computing device, multiple captured images that were captured by the camera, the multiple calibration images including instances of a calibration image presented by a display included in the second computing device, the calibration image being a representation of the calibration image file; and based on the multiple captured images, calibrating the camera.

20 Claims, 12 Drawing Sheets

(56) References Cited

U.S. PATENT DOCUMENTS

| | | | |
|---|---|---|---|
| 10,504,244 B2* | 12/2019 | Bao | G06T 7/85 |
| 10,911,748 B1* | 2/2021 | Molholm | H04N 17/04 |
| 10,940,591 B2* | 3/2021 | Tonogai | B25J 9/1692 |
| 11,172,193 B1* | 11/2021 | Reddy | H04N 23/633 |
| 11,657,535 B2* | 5/2023 | Hu | G06T 7/80 |
| | | | 382/172 |
| 2007/0165034 A1 | 7/2007 | Mielke | |
| 2012/0287287 A1 | 11/2012 | Grossmann et al. | |
| 2013/0132823 A1* | 5/2013 | Sutic | G06F 40/117 |
| | | | 715/234 |
| 2015/0086108 A1 | 3/2015 | Craig et al. | |
| 2018/0068178 A1 | 3/2018 | Theobalt et al. | |
| 2019/0096091 A1* | 3/2019 | Bao | G06T 7/85 |
| 2020/0273205 A1* | 8/2020 | Yamashita | H04N 17/002 |
| 2021/0110575 A1* | 4/2021 | Hu | G06F 3/14 |
| 2021/0176394 A1* | 6/2021 | Okuhara | G06T 7/80 |
| 2021/0398302 A1 | 12/2021 | Guizilini et al. | |
| 2022/0058817 A1 | 2/2022 | Vaquero Gomez et al. | |
| 2023/0015674 A1* | 1/2023 | Davis | G06T 7/80 |

OTHER PUBLICATIONS

Sadekar, et al., "Camera Calibration using OpenCV", LearnOpenCV (https://learnopencv.com), retrieved Nov. 6, 2022, 2022, 13 pages.

Zhang, "A Flexible New Technique for Camera Calibration", Technical Report, MSR-TR-98-71, Microsoft Corporation, 1998, 22 pages.

\* cited by examiner

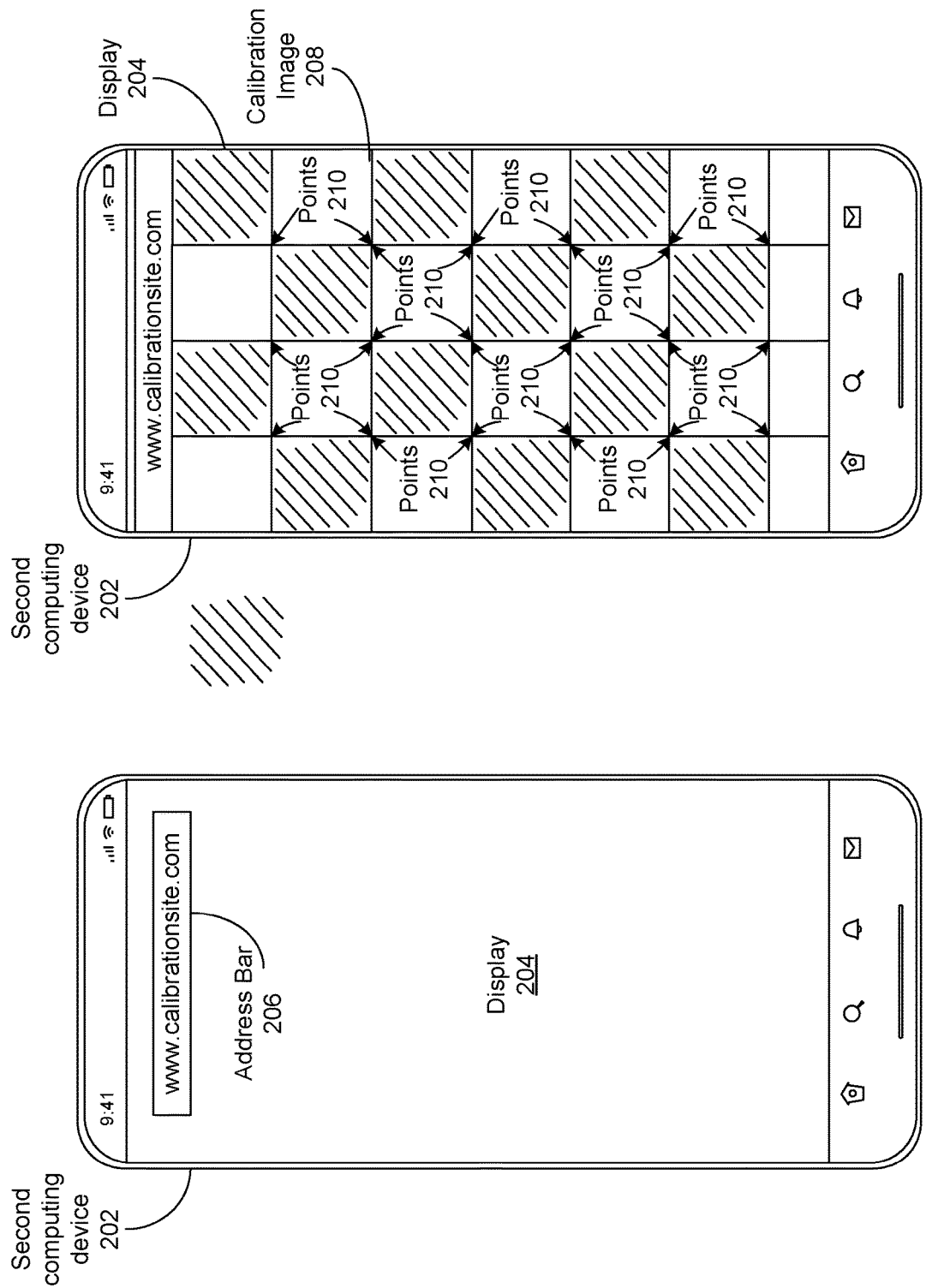

CALIBRATING CAMERA IN ELECTRONIC DEVICE

TECHNICAL FIELD

This description relates to calibrating cameras.

BACKGROUND

Cameras can have small differences between each other, even within a same model produced by a manufacturer. These differences can produce inaccuracies when making determinations based on images captured by a camera.

SUMMARY

A first electronic device can include a camera to be calibrated. The first electronic device can instruct a user to visit and/or obtain a webpage via a second electronic device. The webpage can include a predetermined image, such as a checkerboard. The second electronic device can present the predetermined image. The camera can capture multiple images of the predetermined image. The camera can be calibrated based on multiple captured images.

According to an example, a method performed by a server can include sending a first webpage to a first computing device, the first computing device including a camera, the first webpage including an image-capturing function and including an instruction for a user to obtain a second webpage via a second computing device, the second webpage including a calibration image file; receiving, from the first computing device, multiple captured images that were captured by the camera, the multiple calibration images including instances of a calibration image presented by a display included in the second computing device, the calibration image being a representation of the calibration image file; and based on the multiple captured images, calibrating the camera.

A method performed by a server can include sending, to a first computing device, content including a prompt to cause a second computing device to request a calibration image file; receiving, from the second computing device, a request for the calibration image file; sending, in response to receiving the request for the calibration image file, the calibration image file; receiving, from the first computing device, multiple captured images of a calibration image presented by the second computing device, the calibration image being based on the calibration image file, the multiple captured images of the calibration image having been captured by a camera included in the first computing device; and calibrating the camera based on the multiple captured images.

A method can include receiving, by a first computing device from a remote computing device, a webpage, the webpage including an instruction to request content from a specific Universal Resource Locator (URL); presenting the webpage including presenting the instruction to request the content from the specific URL; capturing, via a camera included in the first computing device, multiple captured images of a calibration image, the calibration image being presented by a second computing device after requesting the content from the specific URL; and sending the multiple captured images to the remote computing device.

The details of one or more implementations are set forth in the accompanying drawings and the description below. Other features will be apparent from the description and drawings, and from the claims.

BRIEF DESCRIPTION OF THE DRAWINGS

FIG. 2A shows the second computing device with a Universal Resource Locator of the webpage entered into an address bar according to an example implementation.

FIG. 2B shows the second computing device presenting a calibration image according to an example implementation.

Like reference symbols in the various drawings indicate like elements.

DETAILED DESCRIPTION

Cameras can capture images, based on determining three-dimensional points of objects, such as facial features. To accurately determine relationships between the three-dimensional points and corresponding two-dimensional images captured by the camera, parameters of the camera, such as focal length, optical center, and radial distortion coefficients of the lens, need to be known. Cameras can have different parameters, even within the same model from the same manufacturer.

A camera can be calibrated based on a calibration image, such as a checkerboard, to determine the parameters. A technical problem with calibrating a camera with a calibration image is that a user may not have the calibration image readily available. A technical solution to easily facilitate calibrating the camera, is that a first computing device can instruct a user to request, via a second computing device, a calibration image file from a remote computing device, such as a webserver. The second computing device can receive the calibration image file, and present a calibration image based on the calibration image file. The calibration image can be a representation of the calibration image file. The second computing device presents the calibration image to the first computing device. A technical benefit of having the second computing device present the calibration image is that the calibration image can be presented by a device that the user already has readily available.

The camera, which is included in the first computing device, can capture multiple calibration images of the calibration image. The camera can capture the multiple calibration images from multiple different angles. The first computing device and/or remote computing device can calibrate the camera based on the multiple calibration images.

After the camera has been calibrated, the camera included in the first computing device can capture multiple facial images of the user's face. The camera can capture the multiple facial images from multiple angles and/or multiple orientations between the camera and the user's face. The first computing device and/or remote computing device can determine facial features of the user's face based on the calibration of the camera and the multiple facial images. The first computing device and/or remote computing device can select a headset, such as a pair of glasses, augmented reality glasses, and/or virtual reality glasses, for the user based on the determined facial features.

Figure 1:
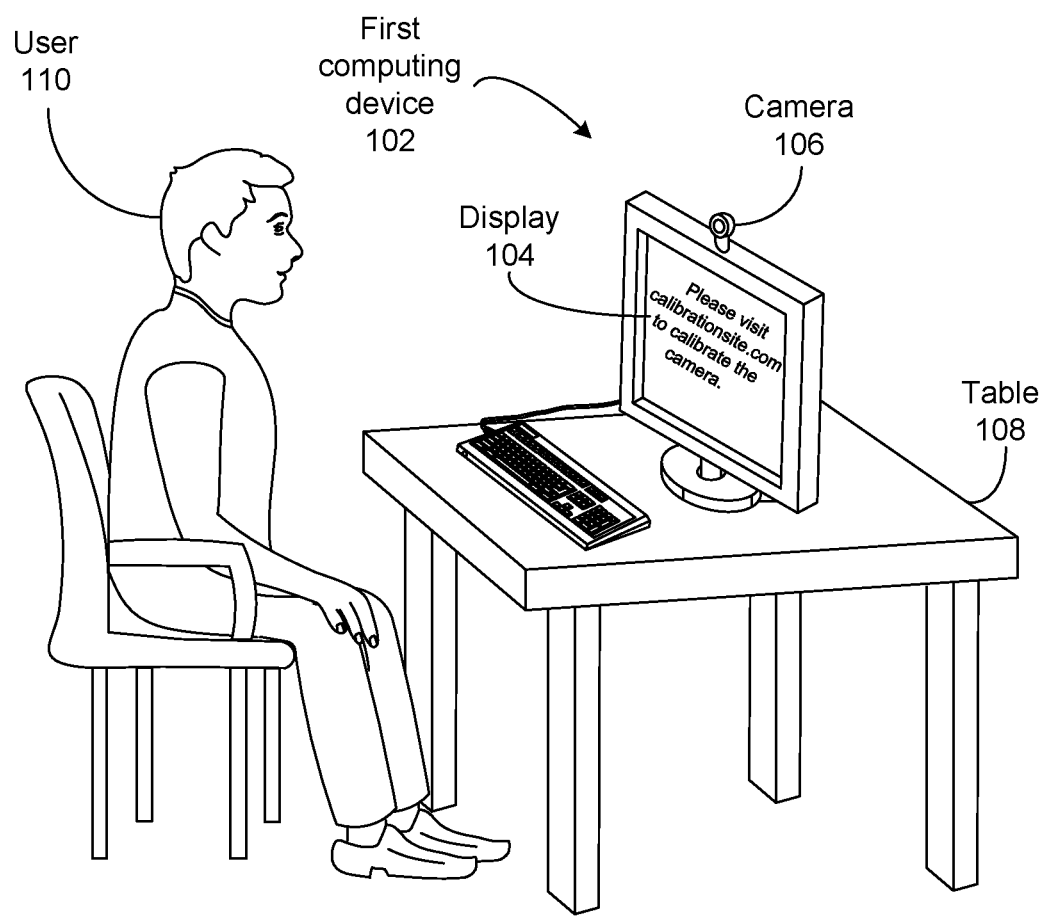
FIG. 1 shows a user in front of a first computing device that includes a camera, with the first computing device presenting an instruction to the user to visit and/or obtain a webpage via a second computing device, according to an example implementation.

FIG. 1 shows a user 110 in front of a first computing device 102 that includes a camera 106, with the first computing device 102 presenting an instruction to the user 110 to visit and/or obtain a webpage via a second computing device 202 (not shown in FIG. 1), according to an example implementation. In the example of FIG. 1, the first computing device 102 includes a desktop computing device disposed on a table 108. However, the first computing device 102 can include a laptop computing device, a netbook computing device, a tablet computing device, or a smartphone, as non-limiting examples.

The first computing device 102 can include a display 104. The display 104 can present graphical output to the user 110. The display 104 can present a prompt for the user 110 to cause the second computing device 202 to request a calibration image file. The prompt can include, for example, a Universal Resource Locator (URL) that identifies and/or names the calibration image file. In the example shown in FIG. 1, the display 104 presents the text, "Please visit calibrationsite.com to calibrate the camera." The text, "Please visit calibrationsite.com to calibrate the camera," includes the example URL, calibrationsite.com, which identifies and/or names the calibration image file.

The display 104 can present the prompt based on content, such as a webpage (which can also be considered a HyperText Markup Language (HTML) page), received from a remote computing device (not shown in FIG. 1). The remote computing device can include a web server. The content received from the remote computing device can include the prompt and/or text, such as, "Please visit calibrationsite.com to calibrate the camera."

In some examples, the content received from the remote computing device can include an image-capturing function. The image-capturing function can cause the first computing device to call a function and/or execute the image-capturing function to capture images via the camera 106.

The first computing device 102 can include the camera 106. The camera 106 can include an optical instrument that can capture an image in two dimensions. The camera 106 can include a digital camera that captures, encodes, and/or stores digital images. The camera 106 can capture, encode, and/or store digital images in formats such as the Graphics Interchange Format (GIF) or the Joint Photographic Experts Group (JPEG) format, as non-limiting examples.

In response to the prompt presented by the first computing device 102, the user 110 can cause the second computing device 202 to request the calibration image file. The user 110 can cause the second computing device 202 to request the calibration image file by entering the URL included in the prompt into an address bar presented by the second computing device 202.

FIG. 2A shows the second computing device 202 with a Universal Resource Locator (URL) of the webpage entered into an address bar 206 according to an example implementation. The second computing device 202 can include a smartphone, a tablet computing device, a netbook computing device, a laptop computing device, or a desktop computing device, as non-limiting examples.

In this example, the second computing device 202 is executing a web browser. A display 204 included in the second computing device presents the web browser, including the address bar 206. The user 110 has entered the URL, calibrationsite.com, presented by the display 104 of the first computing device 102 based on content received from the remote computing device, into the address bar 206. The second computing device 202 will respond to the user 110 entering the URL into the address bar 206 by requesting content, such as a webpage, identified by the URL, from the remote computing device. The remote computing device can include a web server that maintains, stores, and/or executes the file identified by the URL.

FIG. 2B shows the second computing device 202 presenting a calibration image 208 according to an example implementation. In this example, the remote computing device has responded to the second computing device's 202 request for content by sending the content, including the calibration image file, to the second computing device 202. The second computing device 202 has received the content including the calibration image file. The calibration image 208 can be a representation of the calibration image file included in the content.

The second computing device 202 can present a calibration image 208 via a display 204 included in the second computing device 202. The second computing device 202 can present the calibration image 208 as a representation of the calibration image file. In this example, the calibration image 208 includes a checkerboard including squares of alternating and/or contrasting colors, such as black and white. The calibration image 208 image can include M rows of N squares of alternating and/or contrasting colors, such as black and white, where M is greater than one and N is greater than one. The squares can have equal widths and heights. The intersections and/or contact points of the squares can form points 210 that will be recognized by the first computing device 102 and/or remote computing device during calibration of the camera 106.

Figure 3A:
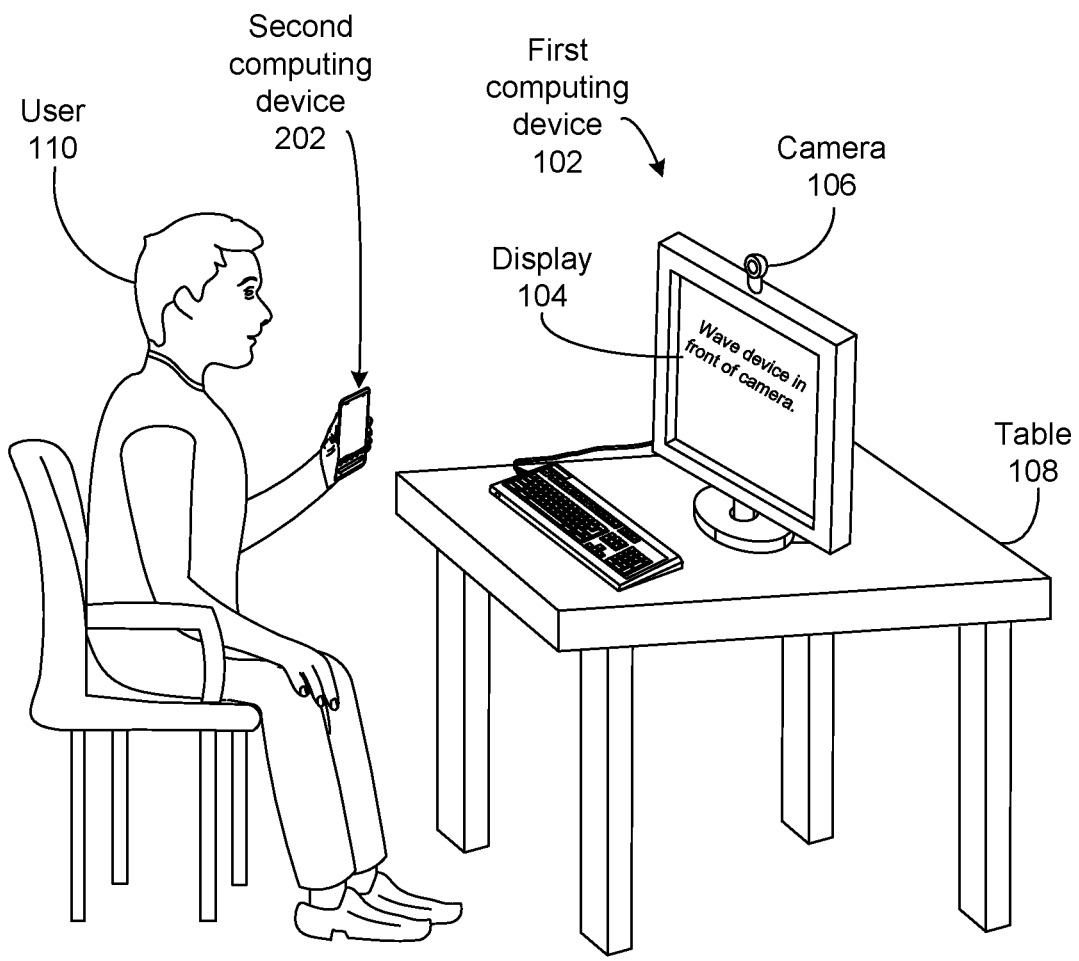
FIGS. 3A and 3B show the user waving the second computing device in front of the camera according to an example implementation.
Figure 3B:
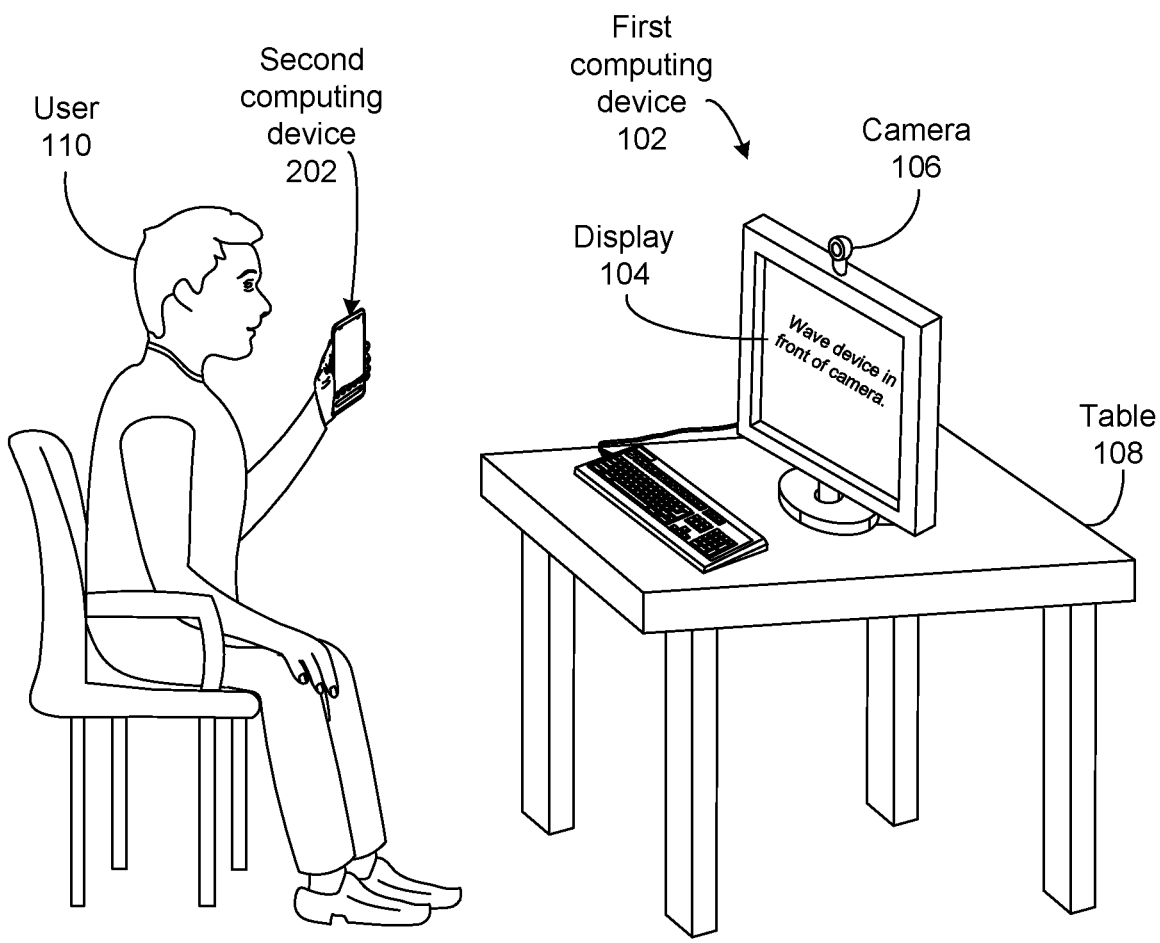

FIGS. 3A and 3B show the user 110 waving the second computing device 202 in front of the camera 106 according to an example implementation. In some examples, the user 110 can rotate or otherwise change the orientation of the second computing device 202 with respect to the camera 106. After the second computing device 202 begins displaying the calibration image 208 (not shown in FIGS. 3A and 3B), the user 110 can move the second computing device 202 with respect to the camera 106. The movement, such as waving, of the second computing device 202 with respect to the camera 106, can change the orientation of the display 204 included in the second computing device 202 with respect to the camera 106. While the orientation of the display 204 changes with respect to the camera 106, the camera 106 can capture multiple images, which can be referred to as captured images and/or captured calibration images, of the calibration image 208 at different angles. The captured calibration images can include instances of the calibration image 208 presented by the display 204 of the second computing device 202. The capturing of multiple captured images and/or captured calibration images at different angles can enable the first computing device 102 and/or remote computing device to calibrate the camera 106. Calibration of the camera 106 by the remote computing device can enable calibration to be performed without additional functionality, such as applications and/or programs, needing to be installed on the first computing device 102.

The first computing device 102 and/or remote computing device can calibrate the camera 106 based on the multiple captured images and/or captured calibration images. In an example in which the remote computing device calibrates the camera 106 based on the multiple captured images and/or captured calibration images, the first computing device 102 can send the multiple captured images and/or captured calibration images to the remote computing device.

The calibration of the camera 106 can include estimating characteristics of the camera 106. The characteristics can include an optical center and/or focal length of the camera, and/or radial distortion coefficients of the lens of the camera 106.

The first computing device 102 or remote computing device can calibrate the camera 106 by finding the checkerboard corners and/or points 210 (shown in FIG. 2B). The first computing device 102 or remote computing device can find the checkerboard corners and/or points 210 by, for example, calling a findChessboardCorners function with the captured images and/or captured calibration images, and the pattern size (M by N) as arguments. In some examples, finding the checkerboard corners and/or points 210 can also include refining the checkerboard corners, such as by calling a cornerSubPix function. In some examples, after finding the checkerboard corners and/or points 210, the first computing device 102 or remote computing device can calibrate the camera 106 by determining a camera intrinsic matrix, which can include values for focal lengths ($f_x$ and $f_y$), coordinates of an optical center in an image plane ($c_x$ and $c_y$), and/or a skew between axes ($\gamma$). In some examples, after finding the checkerboard corners and/or points 210, the first computing device 102 or remote computing device can calibrate the camera 106 by determining a focal length, an aspect ratio, a first offset, and a second offset. The first computing device 102 or remote computing device can determine the camera intrinsic matrix by, for example, calling a calibrateCamera function, with the found checkerboard corners and/or points 210 as arguments.

After the first computing device 102 and/or remote computing device has calibrated the camera 106, the camera 106 can scan and/or capture images, which can be considered facial images, of the user's 110 face. The first computing device 102 and/or remote computing device can select a headset for the user 110 based on the calibration of the camera 106 and the multiple facial images.

Figure 4A:
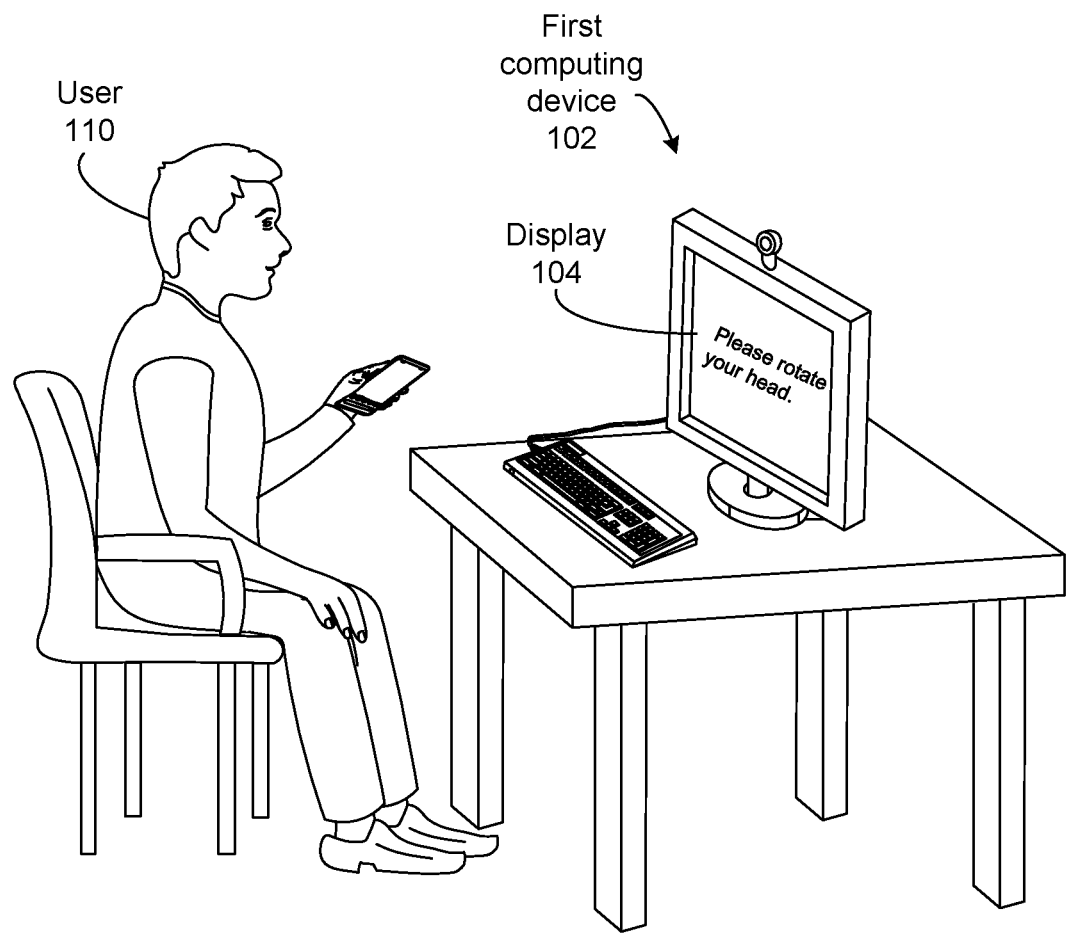
FIG. 4A shows the first computing device capturing facial images of a face of the user according to an example implementation.

FIG. 4A shows the first computing device 102 capturing facial images of a face of the user 110 according to an example implementation. The first computing device 102 can capture the facial images of the face of the user via the camera 106. The user 110 can rotate and/or move the user's 110 head, causing the head and/or face of the user 110 to move with respect to the camera 106. The movement of the head and/or face of the user 110 with respect to the camera 106 can enable the camera 106 to capture multiple facial images at different angles of the face of the user 110.

The first computing device 102 can either determine facial features of the user 110 and select a headset for the user 110 locally, or send the captured facial images to the remote computing device for the remote computing device to determine the facial features and select the headset. Based on the multiple facial images and the calibration of the camera 106, the first computing device 102 and/or the remote computing device can determine the facial features of the user 110 and select a headset for the user 110.

Figure 4B:
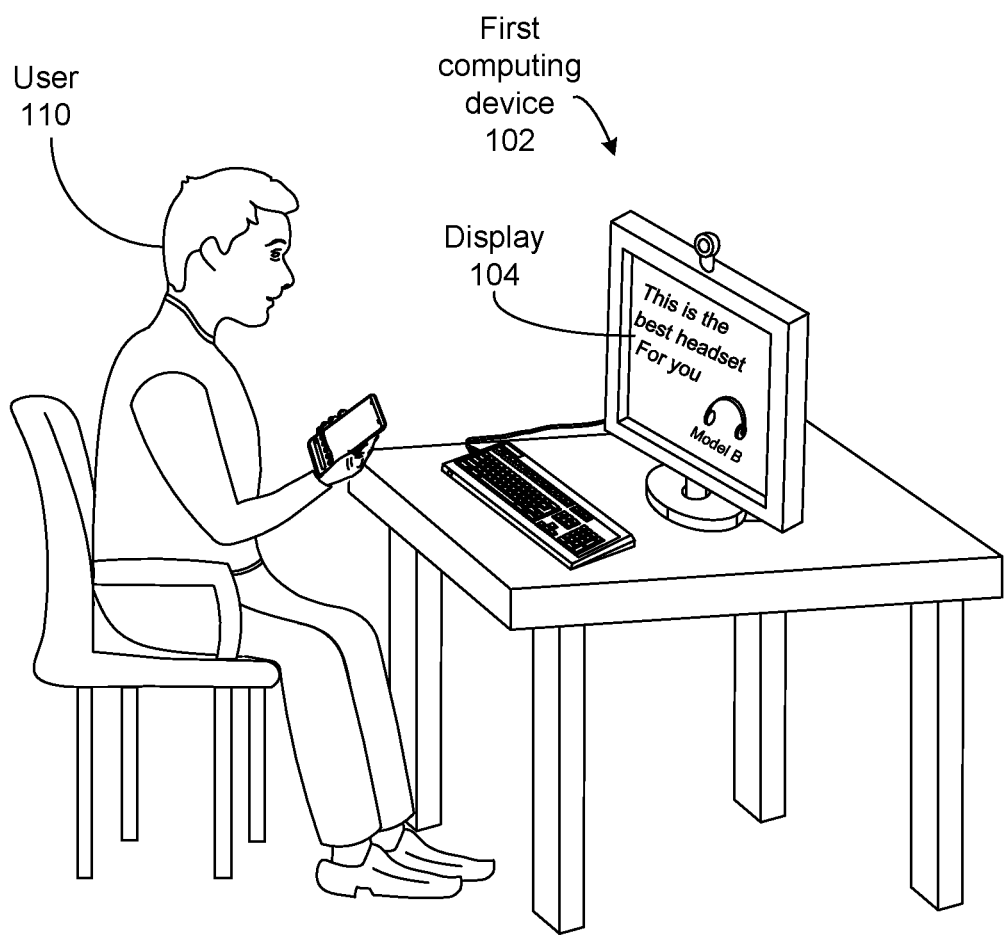
FIG. 4B shows the first computing device presenting a selected headset to the user according to an example implementation.

FIG. 4B shows the first computing device 102 presenting a selected headset to the user 110 according to an example implementation. The first computing device 102 may have selected the headset based on the headset best fitting the features of the user's 110 face, or the remote computing device may have selected the headset based on the headset best fitting the features of the user's 110 face and sent an indication of the selected headset to the first computing device 102. The first computing device 102 can present a representation and/or indication of the selected headset to the user 110 via the display 104.

In some examples, the first computing device 102 can present a "virtual try-on" of the selected headset. The presentation of the virtual try-on can included the first computing device 102 presenting, via the display 104, a representation of the face of the user 110 wearing the selected headset. The presentation can include rotating the head and/or face of the user 110 while wearing the selected headset, to show what the user 110 will look like from different angles while wearing the selected headset. In some examples, the first computing device 102 can receive, from the remote computing device, a page that, when rendered by the first computing device 102, presents the face of the user 110 wearing the selected headset. In some examples, the first computing device 102 can generate and present the face of the user 110 wearing the selected headset based on the captured facial images and one or more images and/or representations of the selected headset.

While FIGS. 1 through 4B have described the first computing device that includes the camera as a desktop computing device and the second computing device that presents the calibration image as a smartphone, this is merely an example. In some examples, the first computing device can include a mobile device such as a smartphone, and the second computing device can include a larger computing device such as a laptop or desktop computer. In these examples, the first computing device such as the smartphone can direct the user 110 to visit and/or obtain a URL on the second computing device such as a desktop computer, rotate or otherwise move the first computing device with the camera with respect to the display presented by the second computing device, the first computing device can calibrate the camera included in the first computing device, and the user 110 can wave, rotate, or otherwise move the first computing device with respect to the user's 110 face to capture multiple facial images.

Figure 5A:
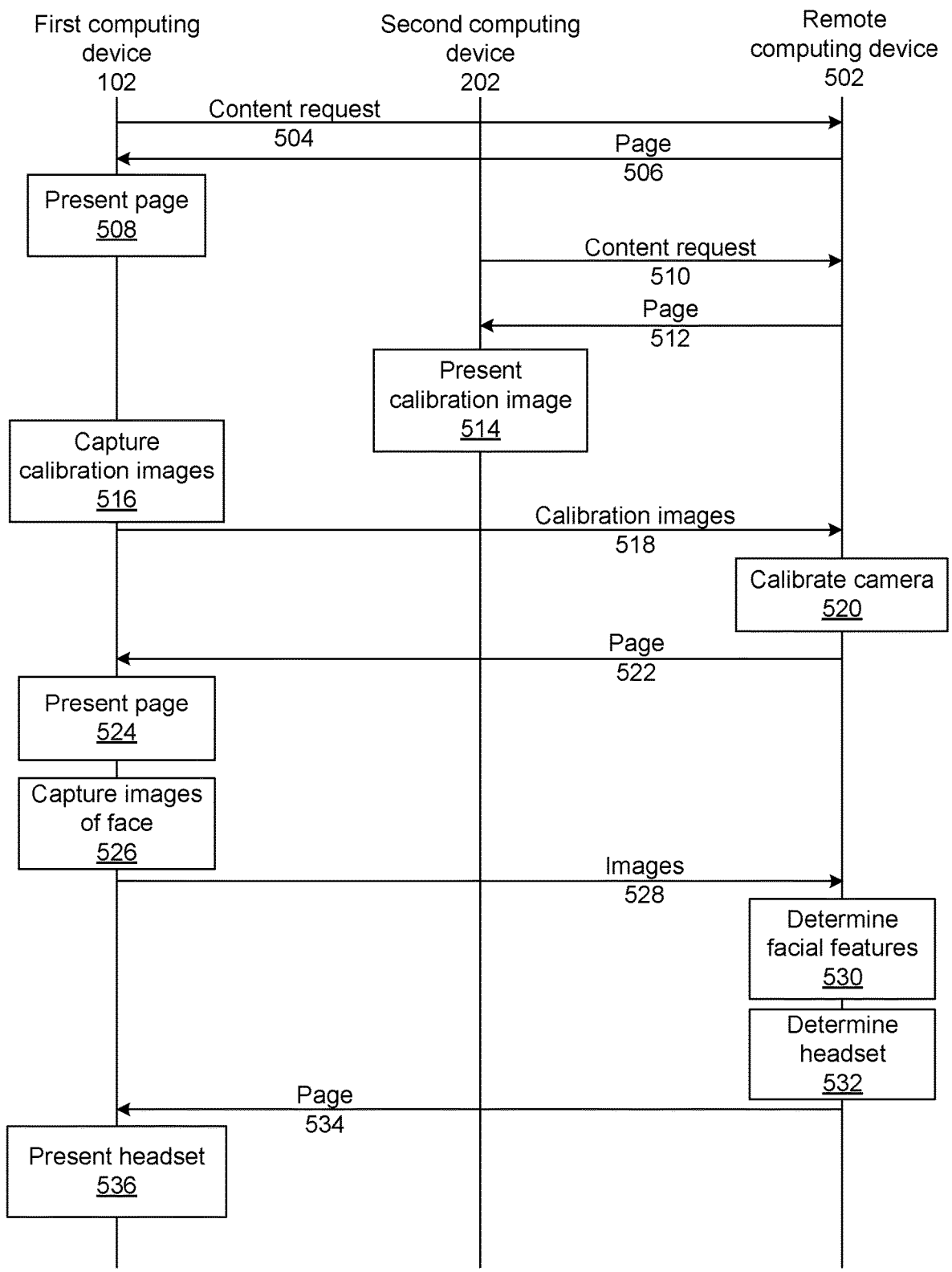
FIG. 5A is a timing diagram showing a remote computing device calibrate the camera and select a headset based on images captured by the first computing device according to an example implementation.

FIG. 5A is a timing diagram showing a remote computing device 502 calibrate the camera 106 and select a headset based on images captured by the first computing device 102 according to an example implementation. The remote computing device 502 can include a server, such as a web server, that maintains and/or hosts the site that includes the content sent to the first computing device 102 and second computing device 202 as described above, such as the content and/or file identified by the URL calibrationsite.com. The remote computing device 502 can communicate with the first computing device 102 and the second computing device 202 via a network such as the Internet. The remote computing device 502 can communicate with the first computing device 102 and the second computing device 202 via a communications protocol such as HyperText Transport Protocol (HTTP).

The first computing device 102 can send a content request 504 to the remote computing device 502. The content request 504 can include a request for a file, such as a file identified by a URL entered into an address bar by the user 110. In some examples, the content request 504 can include a HyperText Transfer Protocol (HTTP) GET request.

The remote computing device 502 can respond to the content request 504 by sending content, such as a page 506, to the first computing device 102. The page 506 can include a webpage and/or HTTP page. The page 506 can include an image file instructing the user 110 to visit and/or obtain the same, or an alternative, page that includes the calibration image 208. The images of the second computing device 202 presenting the calibration image 208.

The first computing device 102 can respond to receiving the page 506 by presenting the page (508). The presentation of the page (508) can include displaying and/or presenting, via the display 104, an instruction for the user to visit and/or obtain a specific URL via the second computing device 202. An example of the first computing device 102 presenting the page (508) is shown in FIG. 1.

Based on the instructions included in the presented page, the user 110 can cause the second computing device 202 to send a content request (510) to the remote computing device 502. The content request 510 can include a specific URL included in, and/or identified by, the presented page. The content request 510 can include a request for a file, such as a file identified by a URL entered into the address bar 206 by the user 110. In some examples, the content request 510 can include an HTTP GET request.

While this example describes the content requested by the second computing device as being maintained by the remote computing device 502, in some examples, the content identified by the URL can be maintained by a third-party server that is not associated with the remote computing device 502. In these examples, the second computing device 202 can send the content request to, and receive the content from, a third-party server that is not associated with the remote computing device 502. Maintaining the requested content and/or image calibration file by the remote computing device 502 has the advantage of ensuring that proportions of the calibration image are correct.

The remote computing device 502 can respond to the content request 510 by sending content, such as a page 512, to the first computing device 102. The page 512 can include a webpage and/or HTTP page. The page 512 can include an image file. The image file can include the calibration image 208. The calibration image 208 can include a checkerboard with squares of alternating, contrasting colors (such as black and white) and/or M rows of N squares of alternating, contrasting colors, with M being greater than one and N being greater than one.

The second computing device 202 can respond to receiving the page 512 by presenting the calibration image 208 (514). An example of the second computing device 202 presenting the calibration image 208 (514) is shown in FIG. 2B.

While the second computing device 202 is presenting the calibration image 514, the user 110 can move, wave, and/or rotate the second computing device 202 with respect to the camera 106. The user 110 can move, wave, and/or rotate the second computing device 202 with respect to the camera 106 to change the angle at which the display 204 presents the calibration image 208 with respect to the camera 106. An example of the user 110 moving, waving, and/or rotating the second computing device 202 with respect to the camera 106 is shown in FIGS. 3A and 3B.

While the user 110 is moving, waving, and/or rotating the second computing device 202 with respect to the camera 106, the camera 106 included in the first computing device 102 can capture calibration images (516). The camera 106 can capture multiple calibration images (516) by capturing multiple images of the display 204 of the second computing device 202 while the display 204 is presenting the calibration image 208. The images of the display 204 and/or calibration image 208 can be considered captured calibration images. The captured calibration images can capture the calibration image 208 at different angles and/or orientations with respect to the camera 106.

In an example in which calibration of the camera 106 is performed by the remote computing device 502, the first computing device 102 can send the multiple captured calibration images 518 to the remote computing device 502. The remote computing device 502 can receive the calibration images 518 that were captured by the camera 106 of the first computing device 102. Based on the received captured calibration images, the remote computing device 502 can calibrate the camera 106 (520). The remote computing device 502 can calibrate the camera 106 (520) by, for example, finding the checkerboard corners and/or points 210 and determining a camera intrinsic matrix. Calibrating the camera 106 (520) can include determining a focal length, an aspect ratio, a first offset, and/or a second offset for the camera 106.

After calibrating the camera (520), the remote computing device 502 can send new content, and/or a new page 522, to the first computing device 102. The new content and/or page 522 can include an instruction to scan the face of the user 110.

In response to receiving the page 522, the first computing device 102 can present the page (524). The presentation of the page (524) can include presenting, via the display 104, an instruction for the user 110 to present the user's 110 face to, and/or rotate the user's 110 face with respect to, the camera 106. The presentation and/or rotation of the user's 110 face enables the camera 106 to capture multiple images of the user's 110 face at different angles with respect to the camera 106.

While the user 110 is presenting and/or rotating the user's 110 face, the camera 106 included in the first computing device 102 can capture multiple images of the user's 110 face. The captured images of the user's 110 face can be considered facial images and/or captured facial images. The camera 106 can capture images of the user's 110 face at different angles with respect to the camera 106. The first computing device 102 can send the multiple captured facial images 528 to the remote computing device 502.

In response to receiving the images 528, the remote computing device 502 can determine facial features (530) of the user 110 based on the facial images. The facial features determined based on the facial images can include an interpupillary distance (distance between the pupils of the eyes), distance and/or extension of the nose from the cheeks, and/or distance of ears from eyes, as non-limiting examples. Based on the determined facial features, the remote computing device 502 can determine the headset (532) that will best fit the user 110.

After determining the headset (532), the remote computing device 502 can send content, such as a page 534, to the first computing device 102. The page 534 can include a webpage and/or HTML page. The page 534 can include and indication and/or representation of the selected content. In response to receiving the page 534, the first computing device 102 can present and/or render the page, which will include presenting the selected headset (536). An example of presenting the headset (536) is shown in FIG. 4B.

Figure 5B:
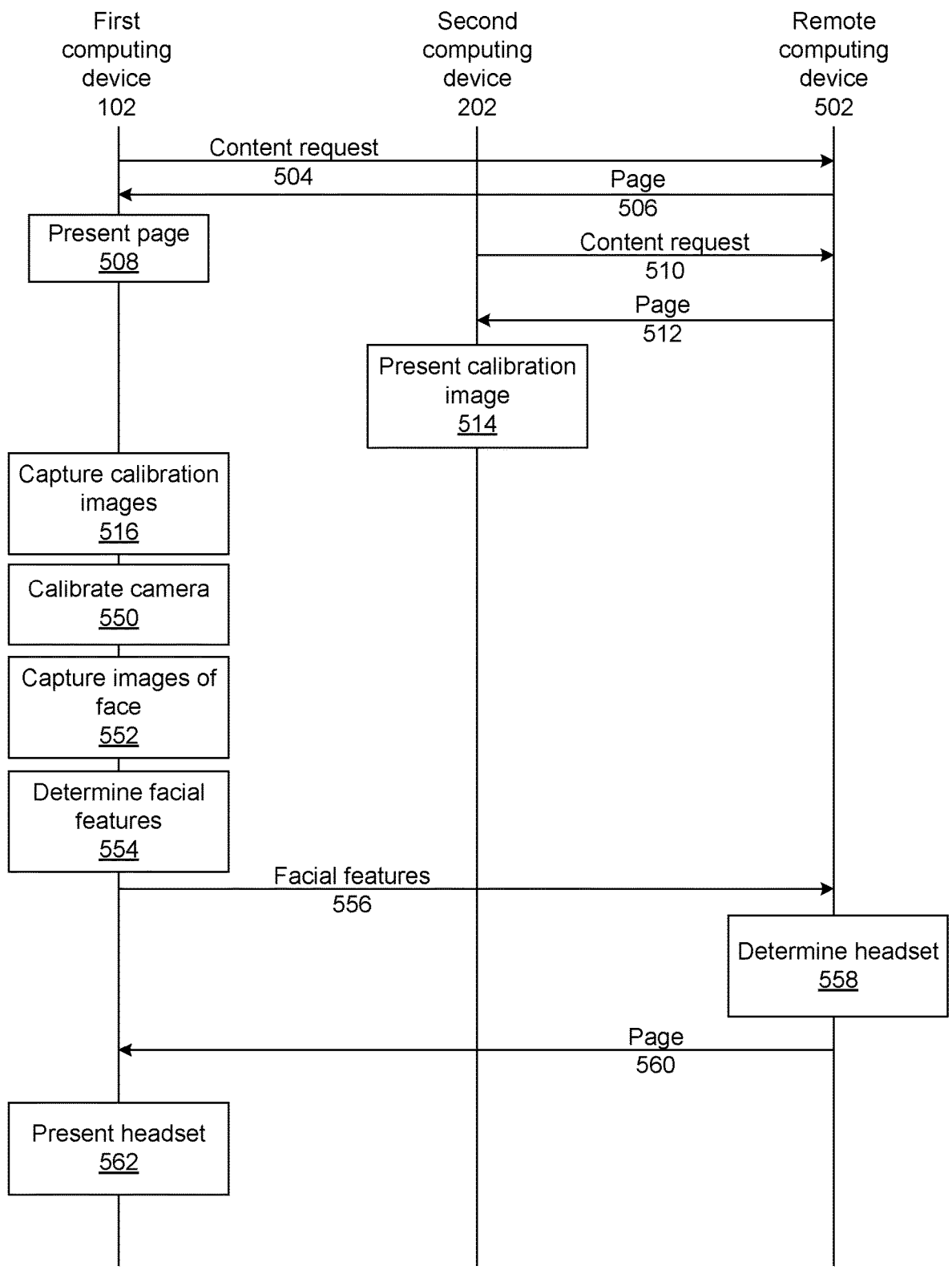
FIG. 5B is a timing diagram showing the first computing device calibrate the camera, and the remote computing device select the headset, based on the images captured by the first computing device according to an example implementation.

FIG. 5B is a timing diagram showing the first computing device 102 calibrate the camera 106, and the remote computing device 502 select the headset, based on the images captured by the first computing device 102 according to an example implementation. The first computing device 102 can send a content request 504 to the remote computing device 502, and the remote computing device 502 can respond to the content request 504 by sending the page 506 to the first computing device 102, as described above with respect to FIG. 5A. The first computing device 102 can present the page (508) as described above with respect to FIG. 5A. The second computing device 202 can send the content request 510 to the remote computing device 502, and the remote computing device 502 can respond to the content request 510 by sending the page 512 to the second computing device 202, as discussed above with respect to FIG. 5A. The second computing device 202 can present the calibration image (514), as discussed above with respect to FIG. 5A. The first computing device 102 can capture the calibration images (516), as discussed above with respect to FIG. 5A.

In the example of FIG. 5B, the first computing device 102 can calibrate the camera 106 (550) in a similar manner to (520) described above. After calibrating the camera 106 (550), the first computing device 102 can capture images of the user's 110 face (552) in a similar manner to (526) described above. After capturing the images of the user's 110 face (552), the first computing device 102 can determine the facial features (554) of the user 110 in a similar manner to (530) described above. The first computing device 102 can send the determined facial features 556 to the remote computing device 502. Based on the determined facial features 556, the remote computing device 502 can determine and/or select a best headset (558) for the user 110 in a similar manner to (532) described above. After determining the headset (558), the remote computing device 502 can send a page 560 that includes and/or indicates the determined headset, similar to the page 534 described above. In response to receiving the page 560, the first computing device 102 can present the selected headset (562), similar to (536) described above.

Figure 6:
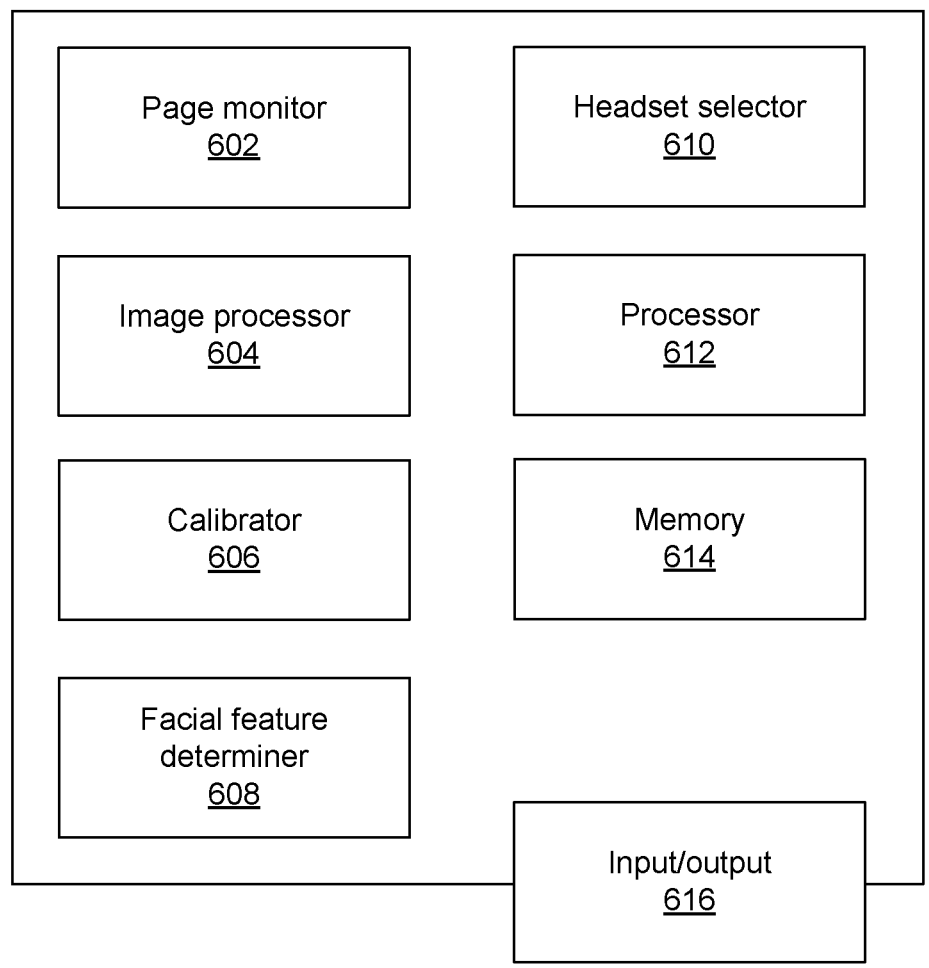
FIG. 6 is a block diagram of a computing device according to an example implementation.

FIG. 6 is a block diagram of a computing device 600 according to an example implementation. The computing device 600 can be an example of the first computing device 102, the second computing device 202, or the remote computing device 502. The computing device 600 is intended to represent various forms of digital computers, such as laptops, desktops, tablets, workstations, personal digital assistants, televisions, servers, blade servers, mainframes, and/or mobile devices, such as personal digital assistants, cellular telephones, smart phones, and other similar computing devices.

The computing device 600 can include a page maintainer 602. The page maintainer 602 can store, maintain, and update pages, such as web pages and/or HTML pages. The pages can include instructions to visit and/or obtain a URL with the calibration image 208, the calibration image 208, an image-capturing function (to capture images of the calibration image 208 and/or images of the face of the user 110), instructions to calibrate the camera 106 (such as by rotating the second computing device 202), instructions to rotate the user's 110 face (to facilitate capturing facial images at multiple different angles), and/or an indication of a selected headset.

The computing device 600 can include an image processor 604. The image processor 604 can process images, such as the captured calibration images and/or captured facial images. The image processor 604 can perform, for example, transformation, demosaicing, nose reduction, and/or image sharpening of the captured calibration images and/or captured facial images.

The computing device 600 can include a calibrator 606. The calibrator 606 can calibrate the camera 106 based on the captured calibration images. The calibrator 606 can calibrate the camera 106 by, for example, finding the checkerboard corners and/or points 210 and determining a camera intrinsic matrix.

The computing device 600 can include a facial feature determiner 608. The facial feature determiner 608 can determine facial features of the user 110 based on the calibrated camera 106 and the captured facial images. The facial features determined by the facial feature determiner 608 based on the facial images can include, for example, an interpupillary distance (distance between the pupils of the eyes), distance and/or extension of the nose from the cheeks, and/or distance of ears from eyes.

The computing device 600 can include a headset selector 610. The headset selector 610 can select and/or determine a headset that will be a best fit for the user 110 based on the facial features of the user 110 determined by the facial feature determiner 608. The headset selector 610 can determine and/or select a headset with a size and/or shape that most closely matches the user's 110 facial features.

The computing device 600 can include at least one processor 612. The at least one processor 612 can execute instructions, such as instructions stored in at least one memory device 614, to cause the computing device 600 to perform any combination of methods, functions, and/or techniques described herein.

The computing device 600 can include at least one memory device 614. The at least one memory device 614 can include a non-transitory computer-readable storage medium. The at least one memory device 614 can store data and instructions thereon that, when executed by at least one processor, such as the processor 612, are configured to cause the computing device 600 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing device 600 can be configured to perform, alone, or in combination with computing device 600, any combination of methods, functions, and/or techniques described herein.

The computing device 600 may include at least one input/output node 616. The at least one input/output node 616 may receive and/or send data, such as from and/or to, a server, and/or may receive input and provide output from and to a user. The input and output functions may be combined into a single node, or may be divided into separate input and output nodes. The input/output node 616 can include, for example, a microphone, a camera, a display such as a touchscreen, a speaker, a microphone, one or more buttons, and/or one or more wired or wireless interfaces for communicating with other computing devices.

Figure 7:
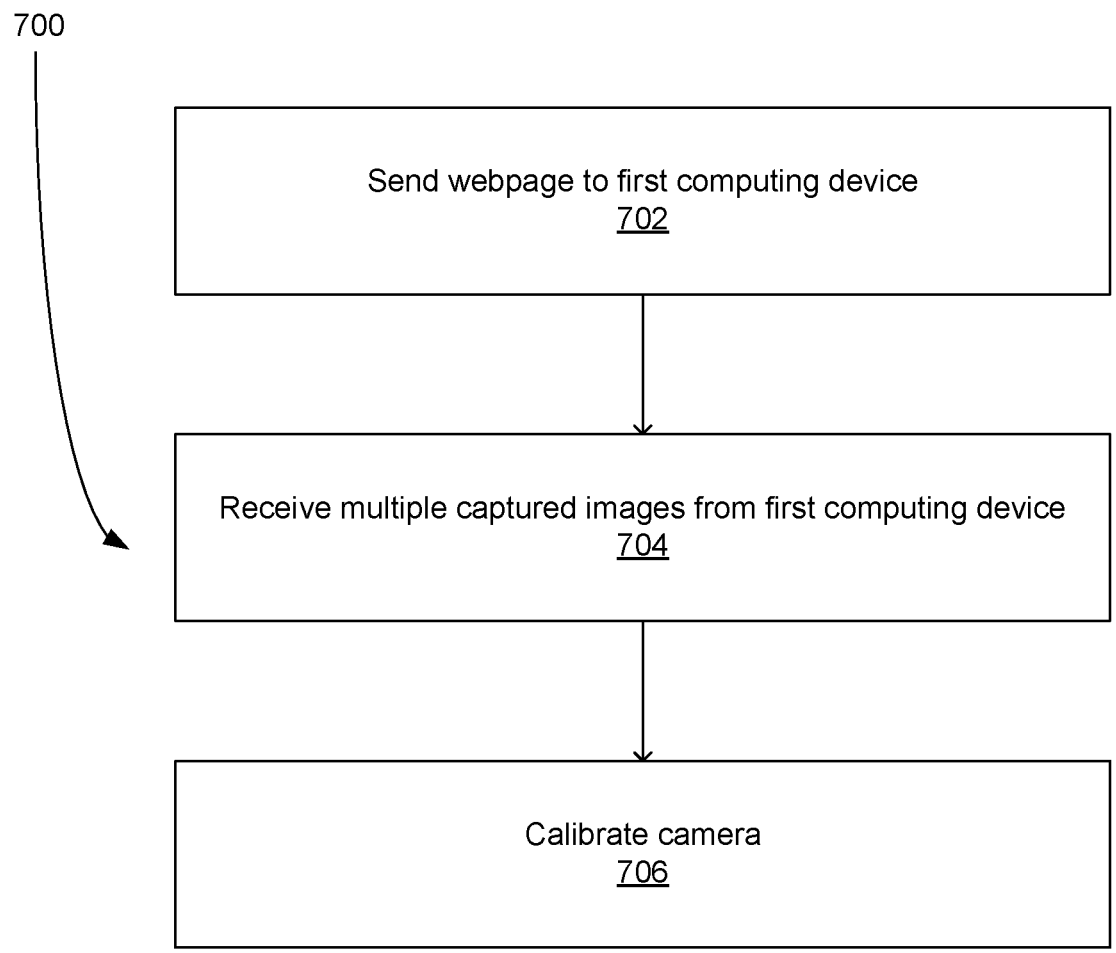
FIG. 7 is a flowchart showing a method performed by the remote computing device according to an example implementation.

FIG. 7 is a flowchart showing a method performed by the remote computing device 502 according to an example implementation. The method 700, which cam be performed by a server such as the remote computing device 502, can include sending a first webpage to a first computing device 102 (702). The first computing device 102 can include a camera 106, the first webpage can include an image-capturing function and can include an instruction for a user to obtain a second webpage via a second computing device 202, the second webpage can include a calibration image file. The method 700 can include the server such as the remote computing device 502 receiving, from the first computing device 102, multiple captured images that were captured by the camera 106 (704) The multiple calibration images can include instances of a calibration image 208 presented by a display 204 included in the second computing device 202. The calibration image 208 can be a representation of the calibration image file. The method 700 performed by the server such as the remote computing device 502 can include, based on the multiple captured images, calibrating the camera 106 (706).

In some examples, the calibration image 208 can include a checkerboard.

In some examples, the multiple captured images can include instances of the calibration image 208 presented by the display at different orientations with respect to the camera 106.

In some examples, the calibrating the camera 106 (706) can include determining a focal length, an aspect ratio, a first offset, and a second offset of the camera.

In some examples, the method 700 can further include the server such as the remote computing device 502 receiving, from the second computing device 202, a request for the second webpage, and sending, to the second computing device 202, the second webpage.

In some examples, the calibration image 208 can include M rows of N squares of alternating colors. M can greater than one and N can be greater than one.

Figure 8:
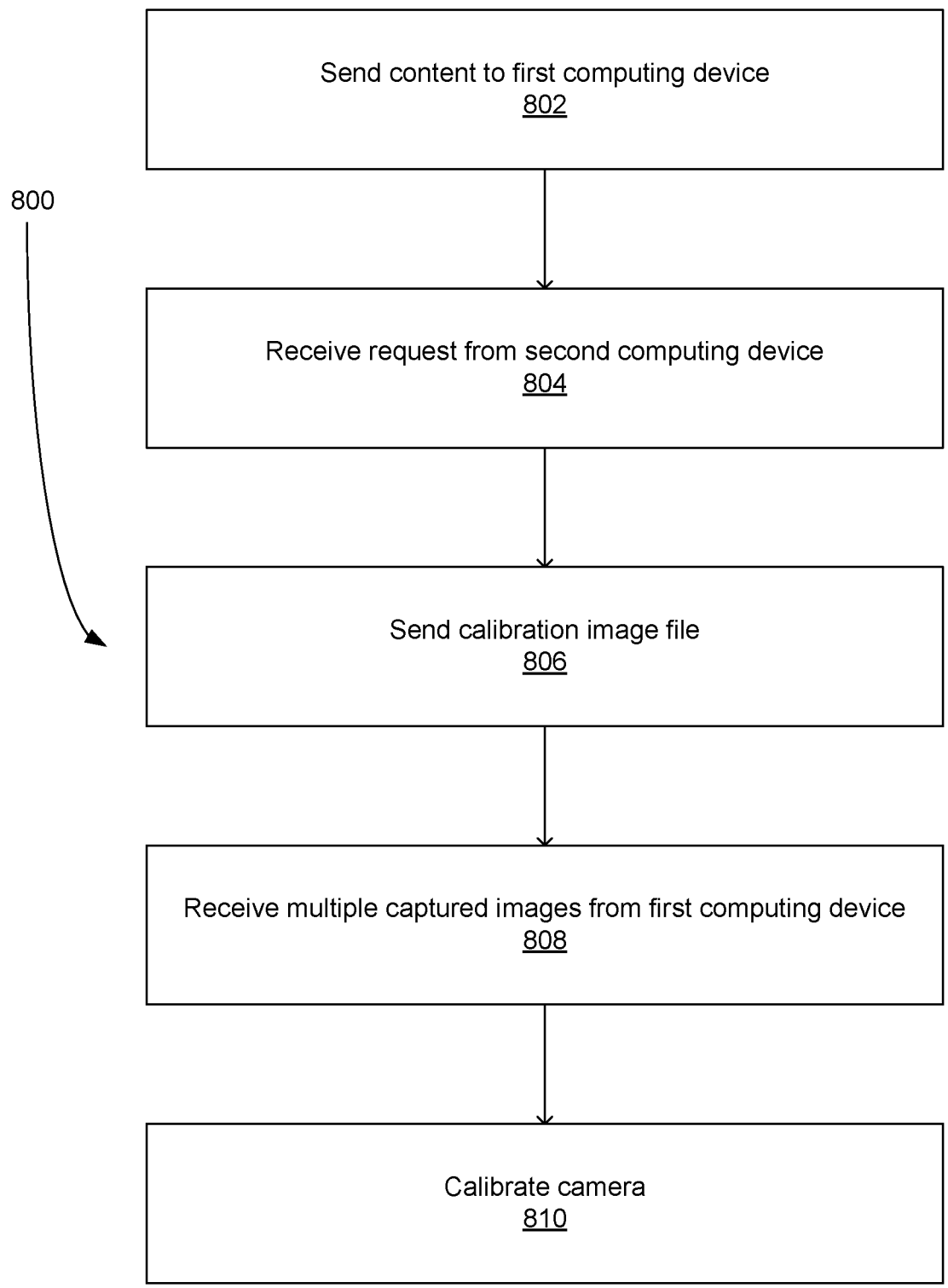
FIG. 8 is a flowchart showing another method performed by the remote computing device according to an example implementation.

FIG. 8 is a flowchart showing another method 800 performed by the remote computing device 502 according to an example implementation. A method 800 performed by a server such as the remote computing device 502 can include sending, to a first computing device 102, content including a prompt to cause a second computing device 202 to request a calibration image file (802). The method 800 can include the server such as the remote computing device 502 receiving, from the second computing device 202, a request for the calibration image file (804). The method 800 can include the server such as the remote computing device 502 sending to the second computing device 202, in response to receiving the request for the calibration image file, the calibration image file (806). The method 800 can include the server such as the remote computing device 502 receiving, from the first computing device 102, multiple captured images of a calibration image 208 presented by the second computing device 202 (808). The calibration image 208 can be based on the calibration image file. The multiple captured images of the calibration image can have been captured by a camera 106 included in the first computing device 102. The method 800 can include the server such as the remote computing device 502 calibrating the camera 106 based on the multiple captured images (810).

In some examples, the calibration image file can be included in a Hypertext Markup Language (HTML) page.

In some examples, the method 800 can further include the server such as the remote computing device 502 receiving, from the first computing device 102, multiple facial images of a face of a user 110. The multiple facial images of the face of the user 110 can been captured by the camera 106. The method 800 can further include the server such as the remote computing device 502 determining features of the user's 110 face based on the calibration of the camera 106 and the multiple facial images.

In some examples, the method 800 can further include the server such as the remote computing device 502 selecting a headset based on the determined features of the user's 110 face.

In some examples, the method 800 can further include the server such as the remote computing device 502 receiving, from the first computing device 102, multiple facial images of a face of a user 110. The multiple facial images of the face of the user can have been captured by the camera 106. The method 800 can further include the server such as the remote computing device 502 selecting a headset based on the calibration of the camera 106 and the multiple facial images.

In some examples, the selected headset can include a pair of glasses.

In some examples, the selected headset can include an augmented reality headset or a virtual reality headset.

In some examples, the calibration image can include M rows of N squares of alternating colors. M can be greater than one and N can be greater than one.

Figure 9:
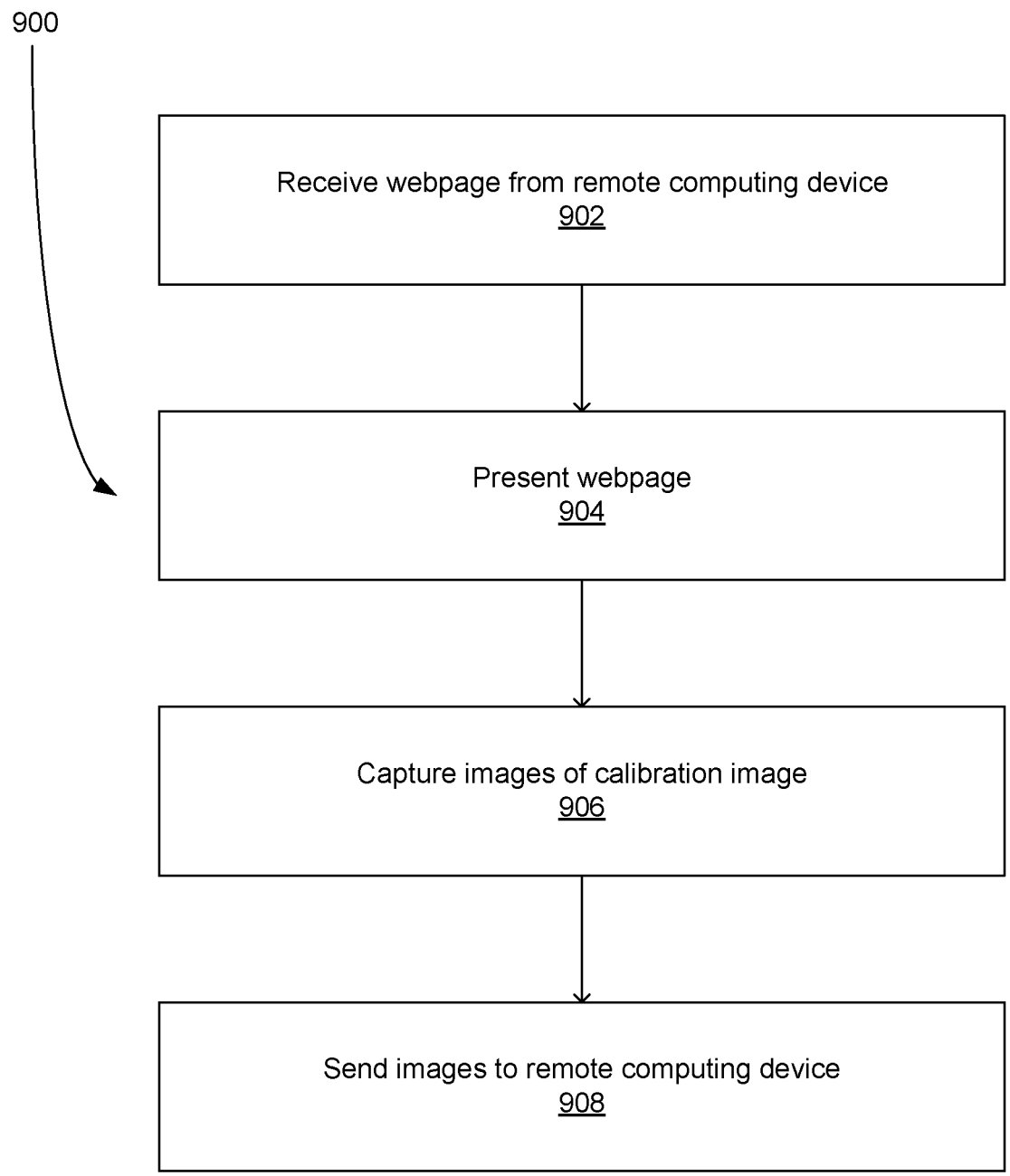
FIG. 9 is a flowchart showing a method performed by the first computing device according to an example implementation.

FIG. 9 is a flowchart showing a method 900 performed by the first computing device 102 according to an example implementation. The method 900 can include receiving, by the first computing device 102 from a remote computing device 502, a webpage (902). The webpage can include an instruction to request content from a specific Universal Resource Locator (URL). The method 900 can include the first computing device 102 presenting the webpage including presenting the instruction to request the content from the specific URL (904). The method 900 can include the first computing device 102 capturing, via a camera 106 included in the first computing device 102, multiple captured images of a calibration image 208 (906). The calibration image 208 can be presented by a second computing device 202 after requesting the content from the specific URL. The method 900 can include the first computing device 102 sending the multiple captured images to the remote computing device 502 (908).

In some examples, the method 900 can further include the first computing device 102 capturing multiple facial images of a face of a user 110, and sending the multiple facial images to the remote computing device 502.

In some examples, the method 900 can further include the first computing device 102 receiving, from the remote computing device 502, an indication of a selected headset, and presenting, via a display 104 included in the first computing device 102, the indication of the selected headset.

In some examples, the selected headset can include a pair of glasses.

In some examples, the selected headset can include an augmented reality headset or a virtual reality headset.

In some examples, the calibration image can include M rows of N squares of alternating colors. M can be greater than one and N can be greater than one.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method performed by a server, the method comprising:
    sending a first webpage to a first computing device, the first computing device including a camera, the first webpage including an image-capturing function and including an instruction for a user to obtain a second webpage via a second computing device, the second webpage including a calibration image file;
    receiving, from the first computing device, multiple captured images that were captured by the camera, the multiple captured images including instances of a calibration image presented by a display included in the second computing device, the calibration image being a representation of the calibration image file; and
    based on the multiple captured images, calibrating the camera.

2. The method of claim 1, wherein the calibration image includes a checkerboard.

3. The method of claim 1, wherein the multiple captured images include instances of the calibration image presented by the display at different orientations with respect to the camera.

4. The method of claim 1, wherein the calibrating the camera includes determining a focal length, an aspect ratio, a first offset, and a second offset of the camera.

5. The method of claim 1, further comprising:
    receiving, from the second computing device, a request for the second webpage; and
    sending, to the second computing device, the second webpage.

6. The method of claim 1, wherein the calibration image includes M rows of N squares of alternating colors, M being greater than one and N being greater than one.

7. A method performed by a server, the method comprising:
    sending, to a first computing device, content including a prompt to cause a second computing device to request a calibration image file;
    receiving, from the second computing device, a request for the calibration image file;
    sending, in response to receiving the request for the calibration image file, the calibration image file;
    receiving, from the first computing device, multiple captured images of a calibration image presented by the second computing device, the calibration image being based on the calibration image file, the multiple captured images of the calibration image having been captured by a camera included in the first computing device; and
    calibrating the camera based on the multiple captured images.

8. The method of claim 7, wherein the calibration image file is included in a Hypertext Markup Language (HTML) page.

9. The method of claim 7, further comprising:
    receiving, from the first computing device, multiple facial images of a face of a user, the multiple facial images of the face of the user having been captured by the camera; and
    determining features of the user's face based on the calibration of the camera and the multiple facial images.

10. The method of claim 9, further comprising selecting a headset based on the determined features of the user's face.

11. The method of claim 7, further comprising:
    receiving, from the first computing device, multiple facial images of a face of a user, the multiple facial images of the face of the user having been captured by the camera; and
    selecting a headset based on the calibration of the camera and the multiple facial images.

12. The method of claim 11, wherein the selected headset includes a pair of glasses.

13. The method of claim 11, wherein the selected headset includes an augmented reality headset or a virtual reality headset.

14. The method of claim 7, wherein the calibration image includes M rows of N squares of alternating colors, M being greater than one and N being greater than one.

15. A method comprising:
receiving, by a first computing device from a remote computing device, a webpage, the webpage including an instruction to request content from a specific Universal Resource Locator (URL);
presenting the webpage including presenting the instruction to request the content from the specific URL;
capturing, via a camera included in the first computing device, multiple captured images of a calibration image, the calibration image being presented by a second computing device after requesting the content from the specific URL; and
sending the multiple captured images to the remote computing device.

16. The method of claim 15, further comprising:
capturing multiple facial images of a face of a user; and
sending the multiple facial images to the remote computing device.

17. The method of claim 16, further comprising:
receiving, from the remote computing device, an indication of a selected headset; and
presenting, via a display included in the first computing device, the indication of the selected headset.

18. The method of claim 17, wherein the selected headset includes a pair of glasses.

19. The method of claim 17, wherein the selected headset includes an augmented reality headset or a virtual reality headset.

20. The method of claim 17, wherein the calibration image includes M rows of N squares of alternating colors, M being greater than one and N being greater than one.

* * * * *